(12) United States Patent
Chuang

(10) Patent No.: US 7,293,490 B2
(45) Date of Patent: Nov. 13, 2007

(54) SAWING ANGLE INDICATING DEVICE FOR A TABLE SAWING MACHINE

(76) Inventor: Bor-Yann Chuang, No. 78, Yungfeng Rd., Taiping City, Taichung (TW) 411

( * ) Notice: Subject to any disclaimer, the term of this patent is extended or adjusted under 35 U.S.C. 154(b) by 259 days.

(21) Appl. No.: 11/245,315

(22) Filed: Oct. 7, 2005

(65) Prior Publication Data

US 2007/0079681 A1    Apr. 12, 2007

(51) Int. Cl.
*B26D 7/27* (2006.01)
(52) U.S. Cl. ............... 83/522.15; 83/477.2; 33/640
(58) Field of Classification Search ............ 83/522.15, 83/522.16, 522.11, 477.2, 471.2, 471.3, 472, 83/473, 477, 477.1; 33/640, 641, 628
See application file for complete search history.

(56) References Cited

U.S. PATENT DOCUMENTS

| 4,641,557 | A | * | 2/1987 | Steiner et al. ............. 83/471.3 |
| 4,754,276 | A | * | 6/1988 | Carlson et al. ........... 83/522.18 |
| 6,858,858 | B2 | * | 2/2005 | Pease ..................... 250/559.19 |
| 7,066,069 | B2 | * | 6/2006 | Ku et al. ........................ 83/473 |
| 2006/0000329 | A1 | * | 1/2006 | Terashima et al. .......... 83/471.3 |
| 2006/0000330 | A1 | * | 1/2006 | Terashima et al. .......... 83/471.3 |
| 2006/0005676 | A1 | * | 1/2006 | Terashima et al. .......... 81/471.3 |
| 2006/0230902 | A1 | * | 10/2006 | Oberheim ................ 83/522.15 |

* cited by examiner

*Primary Examiner*—Stephen Choi
(74) *Attorney, Agent, or Firm*—Ming Chow; Sinorica, LLC

(57) ABSTRACT

A sawing angle indicating device for a table sawing machine includes an angle sensing device composed of a sensing disk, a sensor unit and a circuit device. The sensing disk is firmly fitted on a driving connecting rod to rotate together for putting out signals to the sensor unit. Subsequently, the signals received by the sensor unit are put into the circuit device to be compared and checked to obtain an advancing or retreating datum, and then the signal is put out to the digital indicator on the circuit device. By so designing, the sawing angles of the table sawing machine can be read easily and accurately, able to elevate precision in processing.

7 Claims, 6 Drawing Sheets

SAWING ANGLE INDICATING DEVICE FOR A TABLE SAWING MACHINE

BACKGROUND OF THE INVENTION

1. Filed of the Invention

This invention relates to a sawing angle indicating device for a table sawing machine, particularly to one provided with an angle-sensing device able to accurately measure and indicate deflecting angles of the saw base in a sawing process.

2. Description of the Prior Art

A convention table sawing machine, as shown in FIG. 1, includes a saw base 1 and a driving connecting rod 2. The driving connecting rod 2 is turned to drive the saw base 1 to move bias for an angle, and an angle indicating dial 3 provided at a preset location on the table sawing machine is able to indicate the turning angles of the saw base 1.

However, the angle indicating dial 3 of the conventional table sawing machine indicates the turning angles of the saw base 1 in an analog graduated way, so the sawing angles of the saw base 1 can hardly be indicated accurately, resulting in poor quality in processing.

SUMMARY OF THE INVENTION

This invention has been devised to offer a sawing angle indicating device for a table swing machine, including an angle sensing device composed of a sensing disk, a sensor unit and a circuit device. The sensing disk is firmly fitted at a preset location on a driving connecting rod to rotate together with the driving connecting rod and produce a series of relative signal sets for the sensor unit to sense signals and transmit the signals to the circuit device to be compared and checked. After that, the digital indicator of the circuit device will indicate the sawing angles of the saw base. By so designing, a user can accurately read the sawing angles of the saw base, able to elevate precision in processing.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
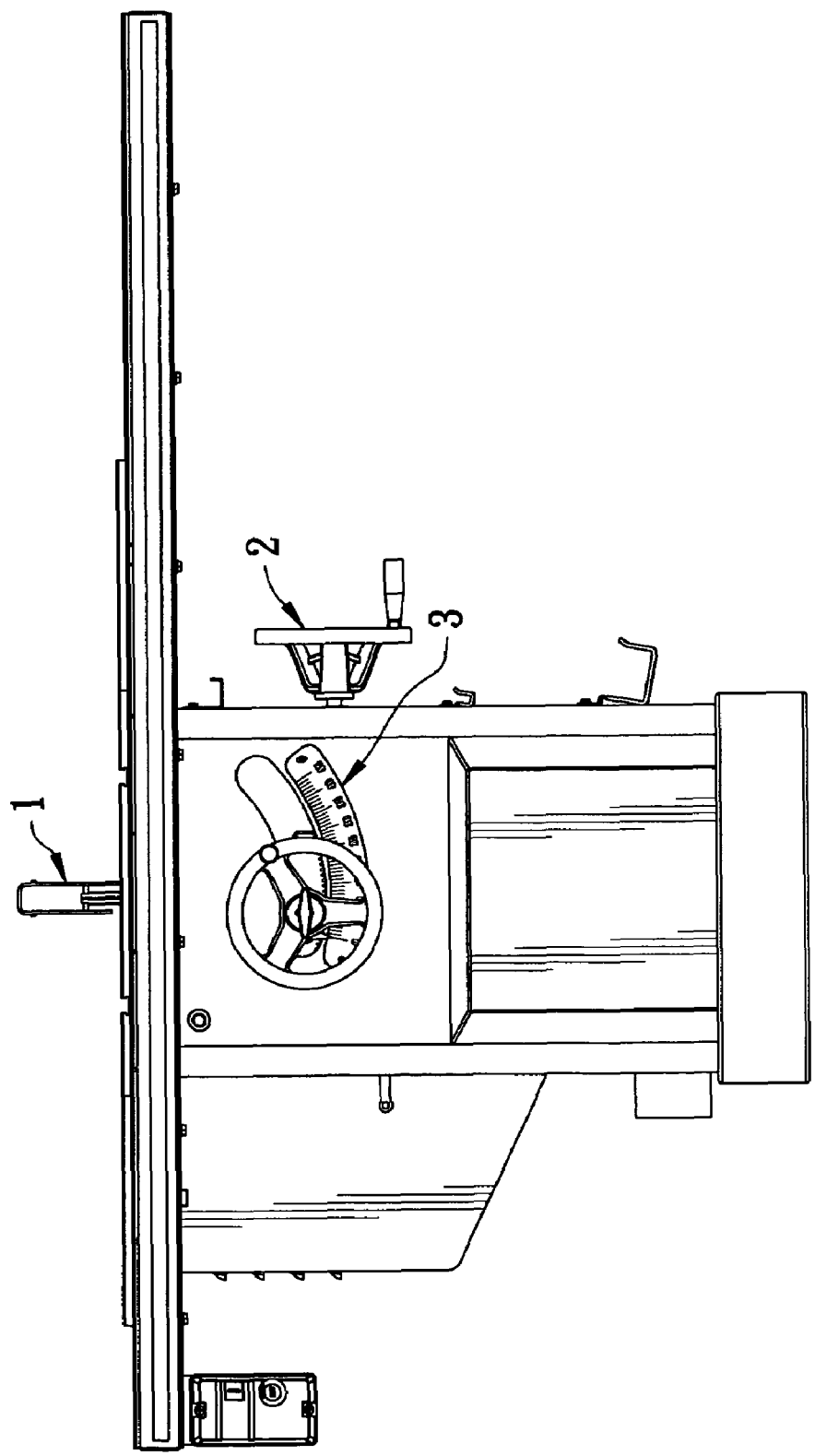
FIG. 1 is a side cross-sectional view of a conventional table sawing machine.
Figure 2:
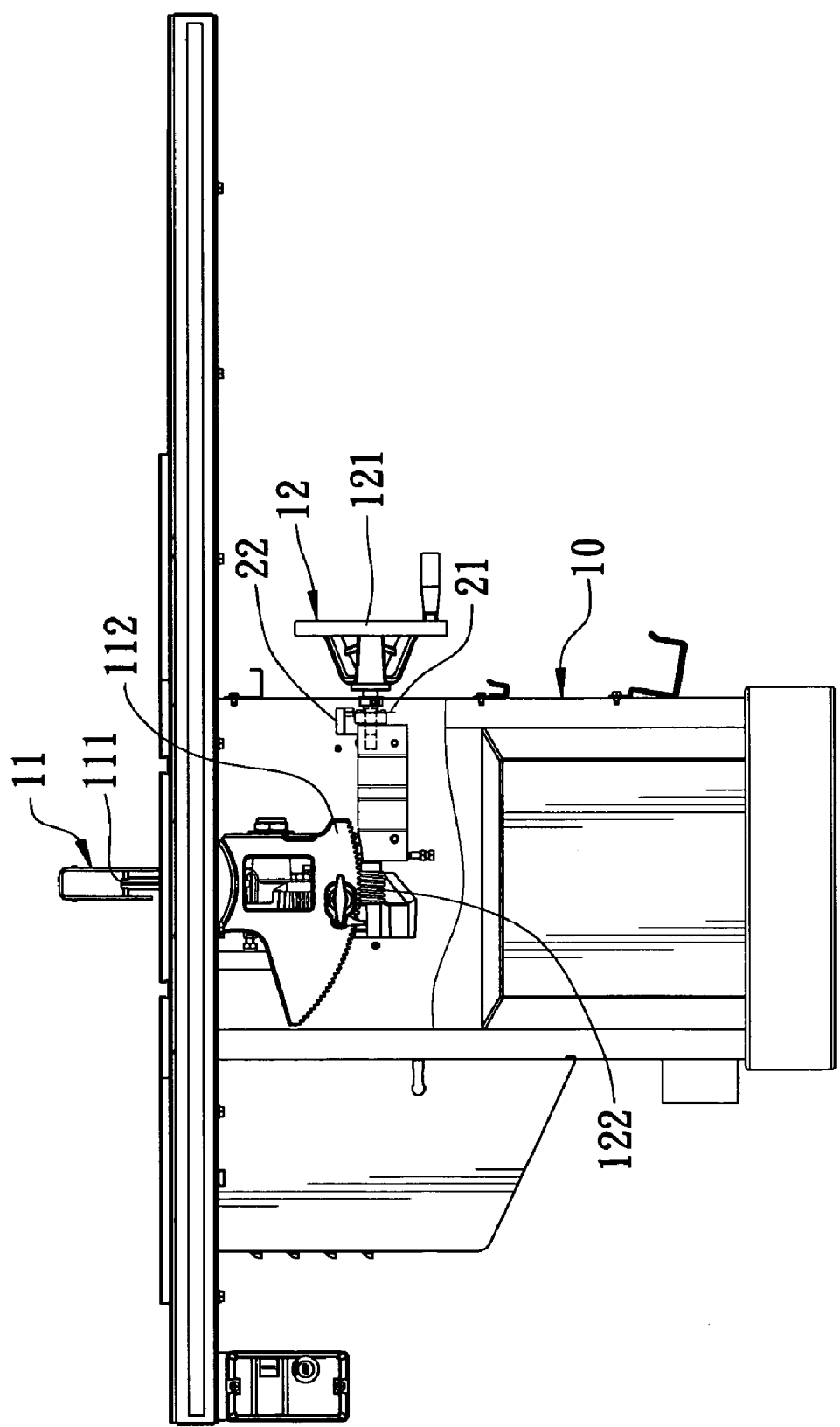
FIG. 2 FIG. 2 is a side cross-sectional view of a first preferred embodiment of a table sawing machine in the present invention.
Figure 3:
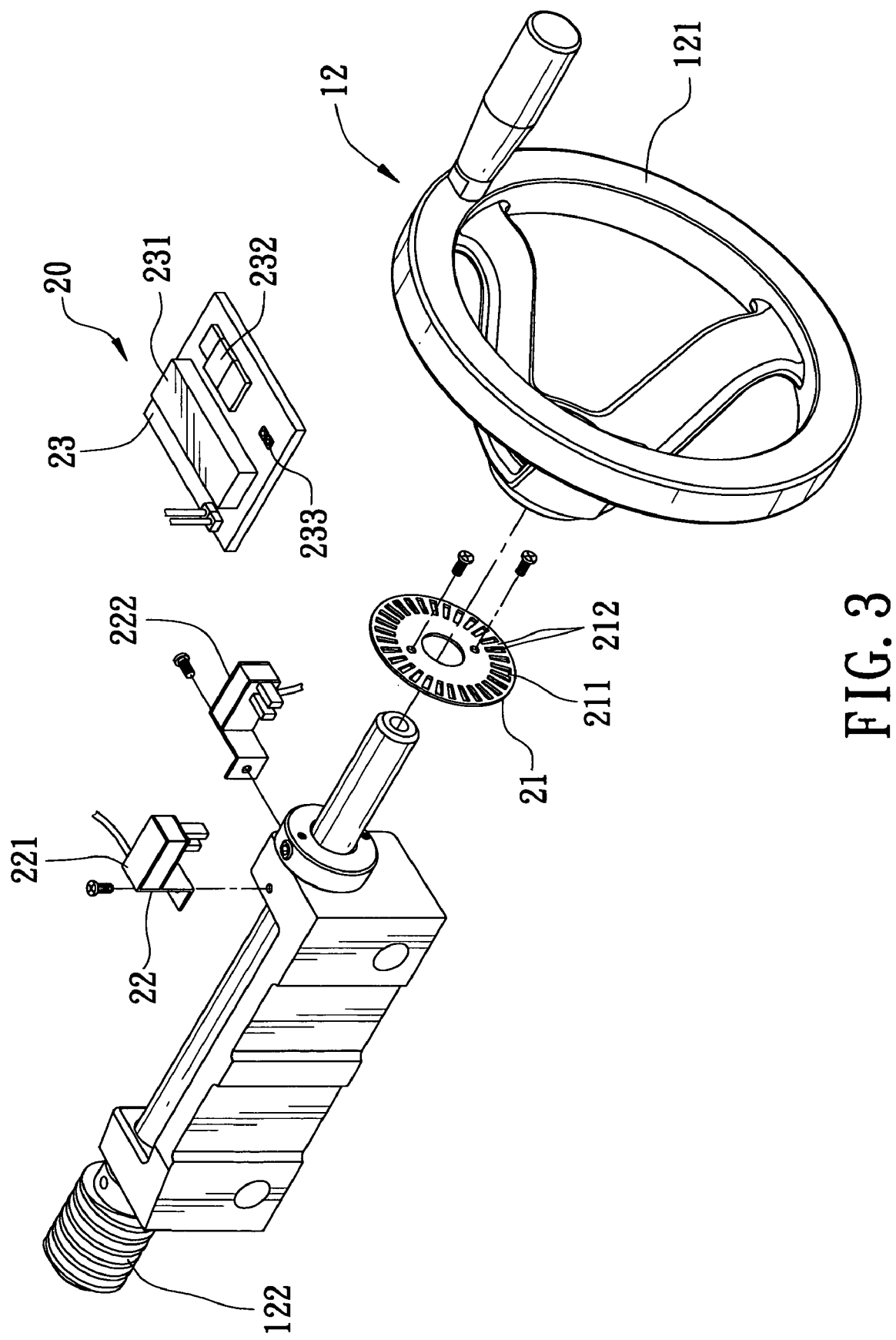
FIG. 3 is an exploded perspective view of the first preferred embodiment of an angle sensing device in the present invention.
Figure 4:
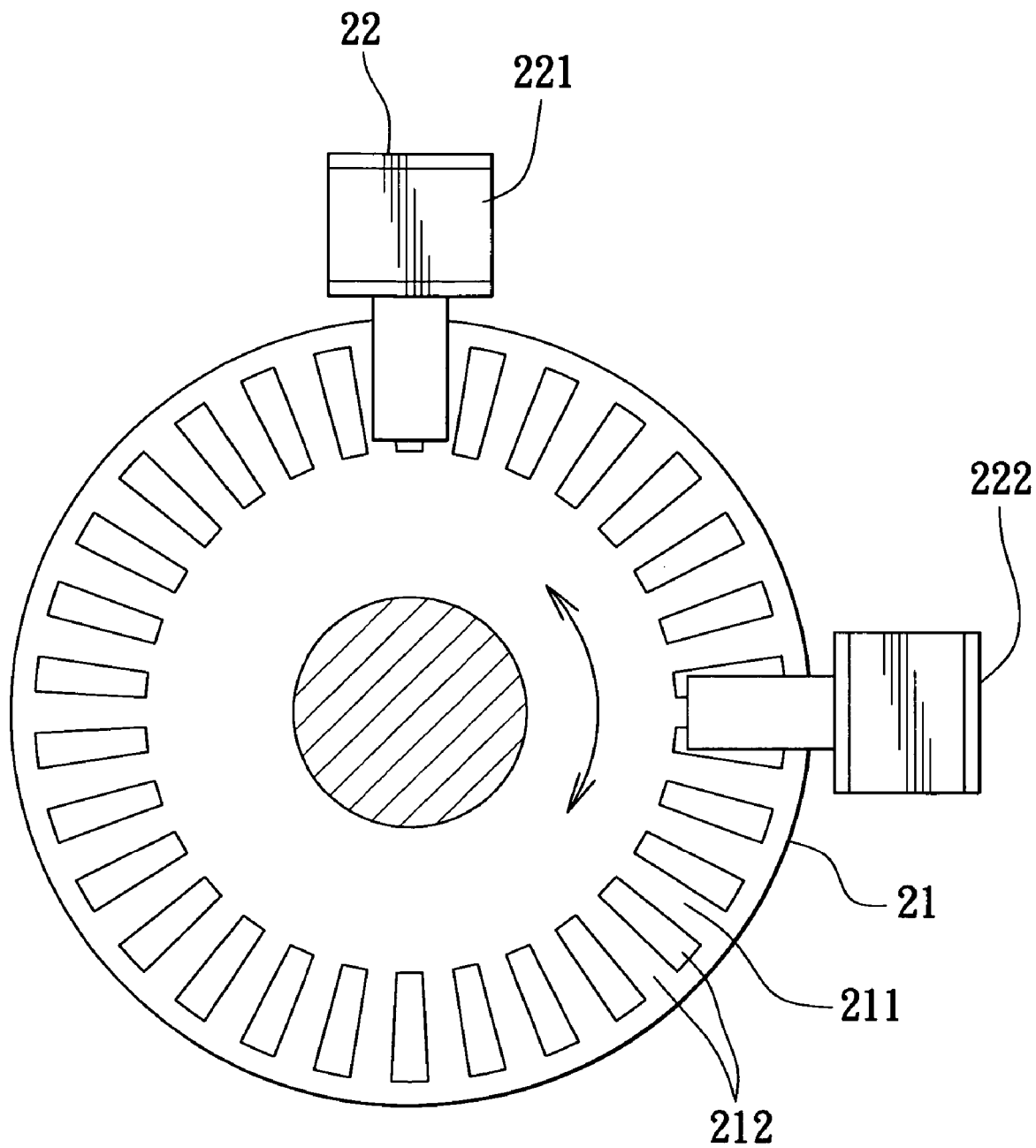
FIG. 4 is a front view of a sensing disk in the first preferred embodiment of the angle sensing device in the present invention.

A first preferred embodiment of a sawing angle indicating device for a table sawing machine, as shown in FIGS. 2, 3 and 4, includes a machine body 10, a saw base 11, a driving connecting rod 12 and an angle sensing device 20 combined together.

The machine body 10 is assembled thereon with the saw base 11 and the driving connecting rod 12.

The saw base 11 is composed of a saw blade 111 and a sector gear 112. The saw blade 111 is actuated by the sector gear 112 to turn for an angle and carry out sawing.

The driving connecting rod 12 has one end provided with a hand-wheel 121 and the other end secured with a worm 122 engaging with the sector gear 112 of the saw base 11 for moving together. The hand-wheel 121 can be turned freely at any angle to actuate the driving connecting rod 12 to rotate together with the worm 122 and actuate the sector gear 112 to turn for an angle.

The angle sensing device 20 is composed of a sensing disk 21, a sensor unit 22 and a circuit device 23. The sensing disk 21 is firmly fitted at a preset location on the driving connecting rod 12 for rotating together and has sensing portion 211 provided thereon with 30 signal sets 212 connected together endlessly and respectively composed of a transparent member and an opaque member. The sensor unit 22 consists of two photo-sensors 221 and 222 respectively assembled on the outer circumferential edge of the sensing disk 21 and positioned spaced apart for an angle; therefore, when the two photo-sensors 221, 222 sense one of the signal sets 212 of the sensing portion 211 of the sensing disk 21, there may arise a phase difference. Then, the signal set is transmitted to the circuit device 23.

The circuit device 23 consists of a microchip unit 231, a digital indicator 232 and a set switch 233. The microchip unit 231 receives the signal coming from the sensor unit 22 and output it to the digital indicator 232. The digital indicator 232 receives the signal transmitted by the microchip unit 231 and indicates an angular value, the smallest angle indicated by the digital indicator 232 being 0.1°. The set switch 233 functions to reset a proportional value between the signal sensed by the sensor unit 22 and the angle of the saw base 11 to enable the table sawing machine to be corrected anew.

To adjust the angle of the saw base 11 of the table sawing machine, as shown in FIGS. 2, 3 and 4, firstly, the driving connecting rod 12 together with the worm 122 is turned to drive the sector gear 112 to rotate and actuate the saw base 11 to turn for an angle. Simultaneously, the sensing disk 21 fitted on the driving connecting rod 12 will be rotated together with the driving connecting rod 12, and the signal sets 212 of the sensing portion 211 on the sensing disk 21 will alternately produce relative signals to the sensor unit 22. After the two photo-sensors 221, 222 of the sensor unit 22 receive the signal, the signal to be put out will produce potential difference with different angles; therefore, the two photo-sensors 221, 222 will put out the signal with a phase difference of 90 degrees. When the phase-difference signal produced by the two photo-sensors 221, 222 is input into the microchip unit 231, the microchip unit 231 will compare and check the phase difference of the signal to obtain an advancing or retreating signal value. Then, the signal value is converted to let the number of the signal sets 212 measured by the sensor unit 22 converted into a slanting angle value of the saw base 11. The set switch 233 functions to reset an angular value between the signal sets 212 on the sensing disk 21 and the saw base 11 to enable the table sawing machine to be corrected anew for avoiding errors produced between the sensing disk 21 and the rotating angular value of the saw base 11.

Figure 5:
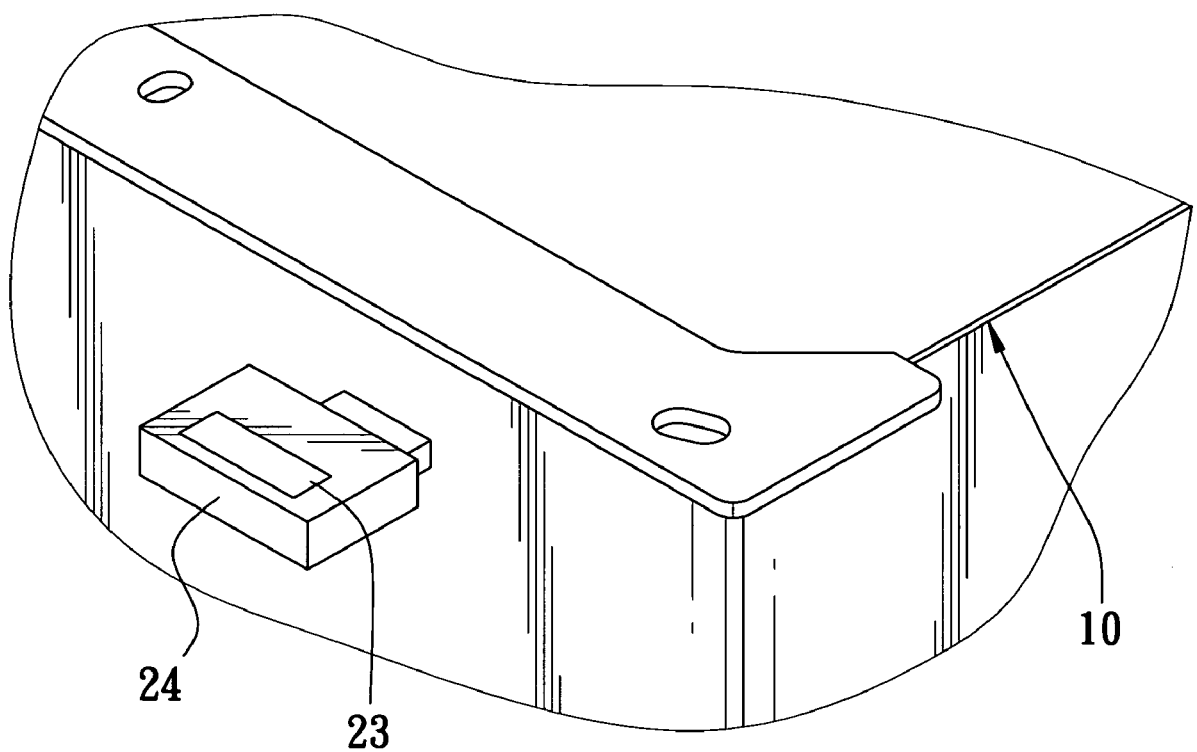
FIG. 5 is a perspective view of an external combining box vertically assembled on the outer side of the machine body in the present invention.

In addition, referring to FIG. 5, the circuit device 23 is received in an external combining box 24 vertically assembled on the outer side of the machine body 10 so that a user can directly and easily read and adjust the angular value of the table sawing machine.

Figure 6:
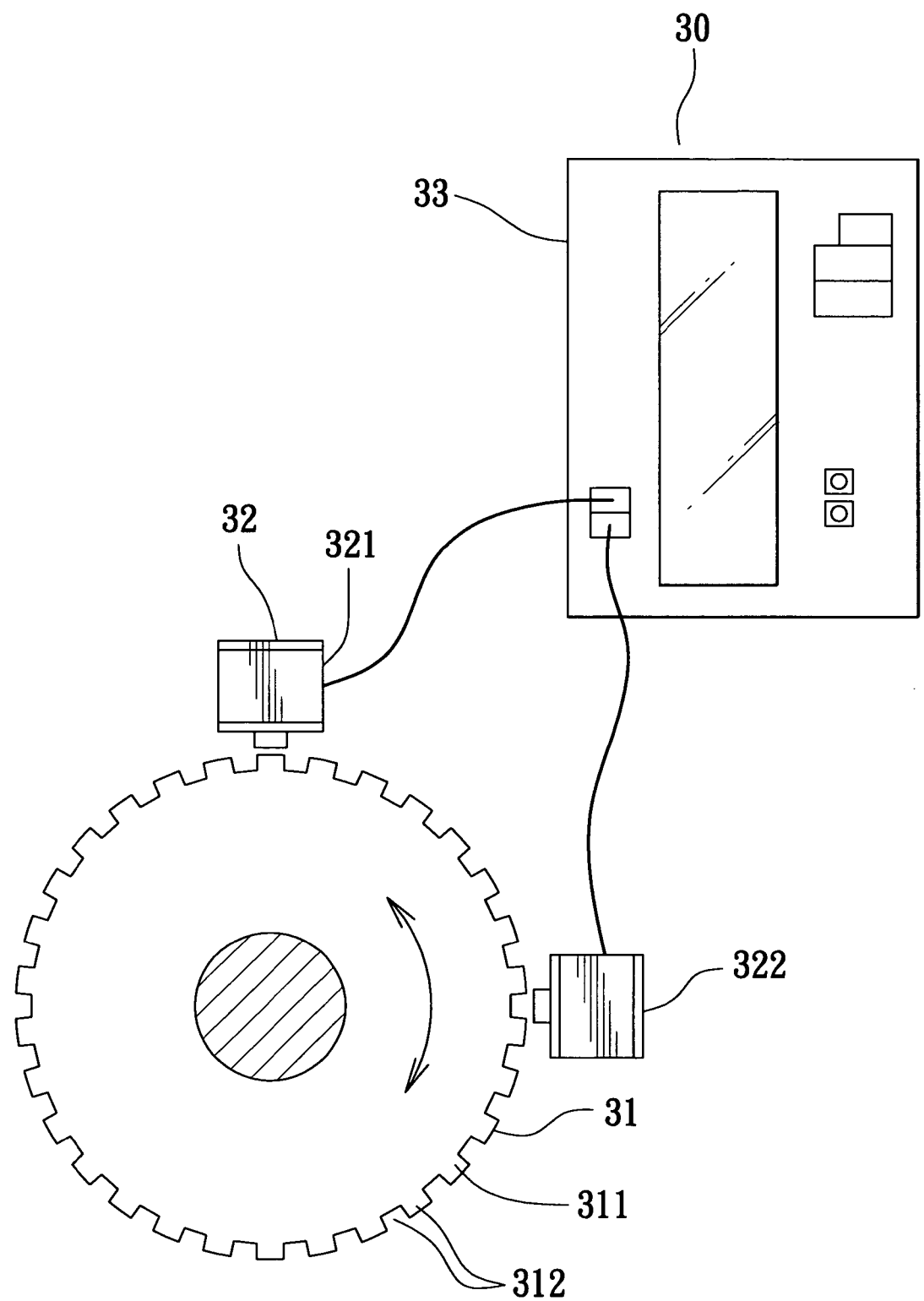
FIG. 6 is a front view of a second preferred embodiment of the sensing disk of the angle sensing device in the present invention.

A second preferred embodiment of a sawing angle indicating device for a table sawing machine in the present invention, as shown in FIG. 6, includes an angle sensing device 30 composed of a sensing disk 31, a sensor unit 32 and a circuit device 33, which all have the same functions as those described in the first preferred embodiment. The sensing disk 31 has a sensing portion 311 composed of a series of signal sets 312 respectively composed of a concave member and a convex member connected together endlessly. The sensor unit 32 positioned abutting the outer circumferential edge of sensing sets 312 is composed of two proximity switches 321 and 322. When the two proximity switches 321, 322 come close to the sensing portion 311, they will produce potential difference due to the concave and the convex members of the signal sets 312.

As can be understood from the above description, this invention has the following advantages.

1. The angles of the saw base can directly and easily are seen through the digital indicator on the circuit device, needless to be measured with eyes, and able to avoid errors in measuring and elevate precision in sawing.

2. The signal sets of the circuit device and the angle of the saw base, which are put in by the sensor unit, can be set and corrected repeatedly; therefore, after being employed for a period of time, they can be still kept precise.

3. The circuit device is assembled on the outer side of the table sawing machine at a location where a user can quickly read the angular signal of the table sawing machine, reducing time needed for adjustment of the saw base during processing.

While the preferred embodiments of the invention have been described above, it will be recognized and understood that various modifications may be made therein and the appended claims are intended to cover all such modifications that may fall within the spirit and scope of the invention.

I claim:

1. A sawing angle indicating device for a table sawing machine comprising a saw base and a driving connecting rod, a worm of said driving connecting rod turned to actuate a sector gear on said saw base to rotate for an angle, said saw base actuated by said sector gear to shift bias for an angle within a preset range; and, Characterized by an angle sensing device assembled at a preset location on said driving connecting rod, said angle sensing device composed of a sensing disk, a sensor unit and a circuit device, said sensing disk provided with a sensing portion and firmly fitted on said driving connecting rod, said sensing portion of said sensing disk composed of a series of relative signal sets, said sensor unit composed of two sensors spaced apart with an angle, said two sensors respectively positioned at a preset location of the outer circumferential edge of said sensing disk, said circuit device composed of a micro-chip unit, a digital indicator and a set switch.

2. The sawing angle indicating device for a table sawing machine as claimed in claim 1, wherein said sensors are photo-sensors.

3. The sawing angle indicating device for a table sawing machine as claimed in claim 1, wherein said sensors are infrared ray sensors.

4. The sawing angle indicating device for a table sawing machine as claimed in claim 1, wherein said sensors are proximity switches.

5. The sawing angle indicating device for a table sawing machine as claimed in claim 1, wherein each said signal set on said sensing disk is composed of a transparent member and an opaque member.

6. The sawing angle indicating device for a table sawing machine as claimed in claim 1, wherein each said signal set on said sensing disk is composed of a concave member and a convex member.

7. The sawing angle indicating device for a table sawing machine as claimed in claim 1, wherein said circuit device is received in an external combining box assembled on the outer side of said table sawing machine.

* * * * *